April 19, 1932.  H. E. MORTON  1,854,522
FLASH REMOVING MACHINE
Filed Jan. 19, 1931  5 Sheets-Sheet 2
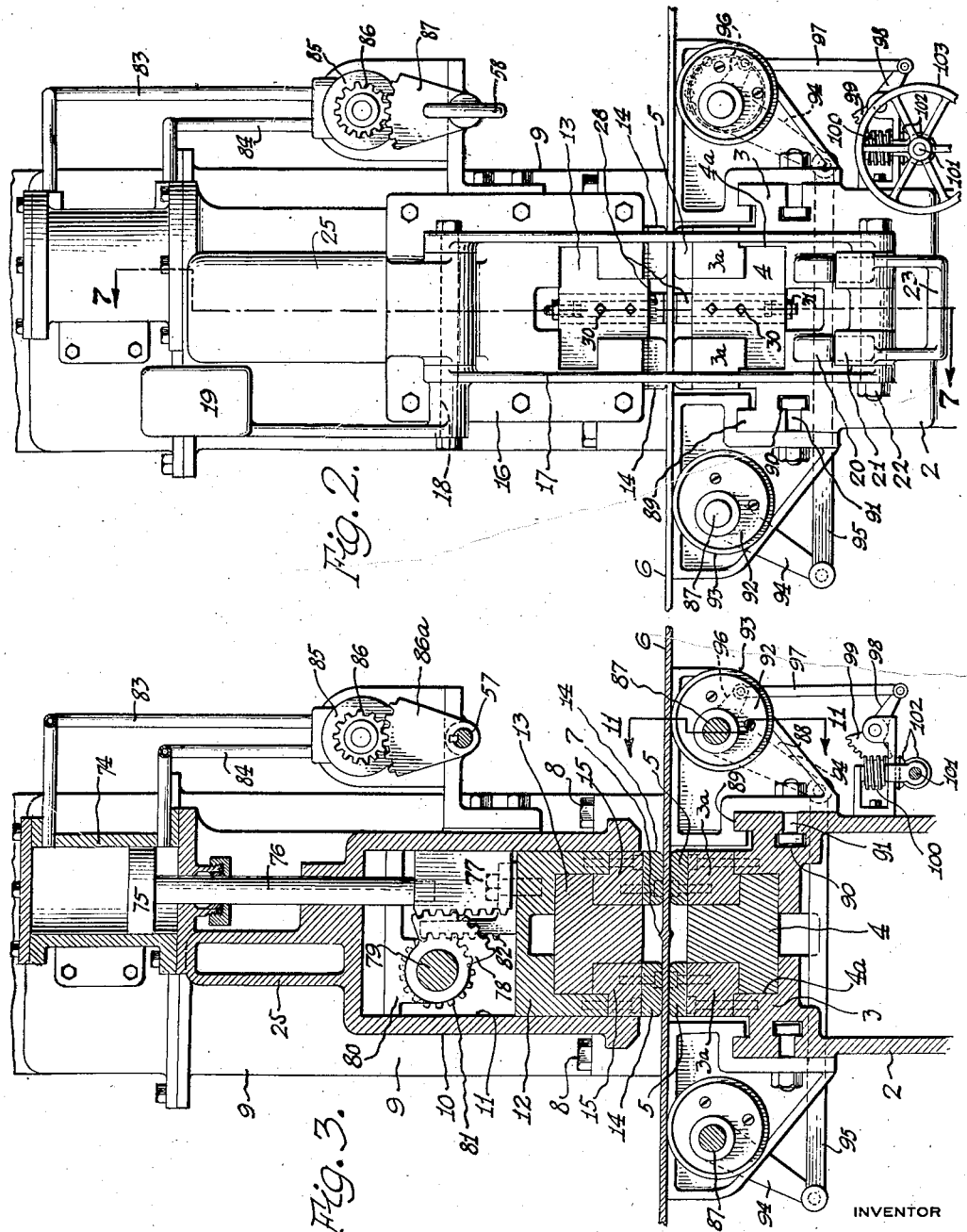
INVENTOR
Henry E. Morton,
BY
ATTORNEYS April 19, 1932.  H. E. MORTON  1,854,522
FLASH REMOVING MACHINE
Filed Jan. 19, 1931  5 Sheets-Sheet 3
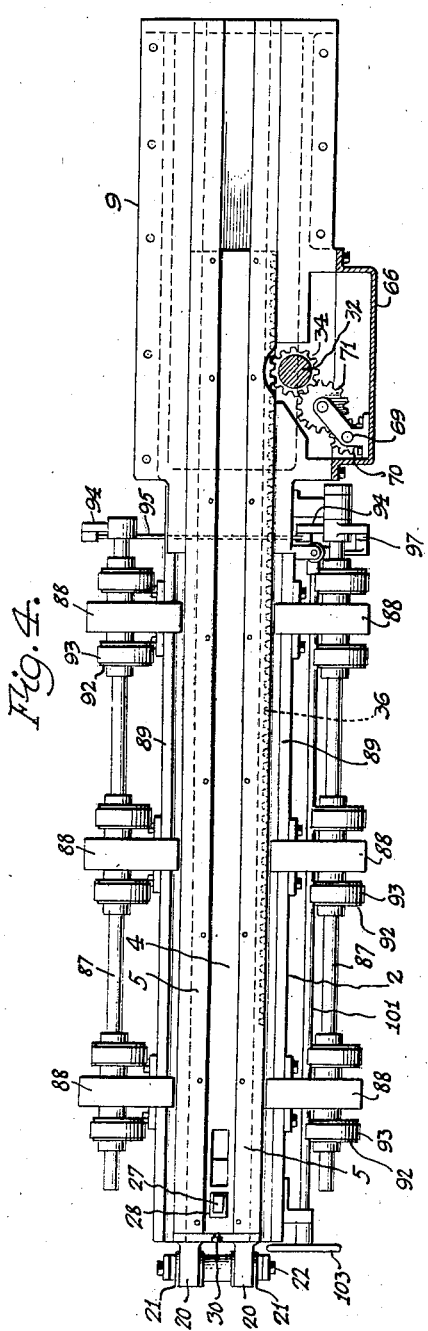
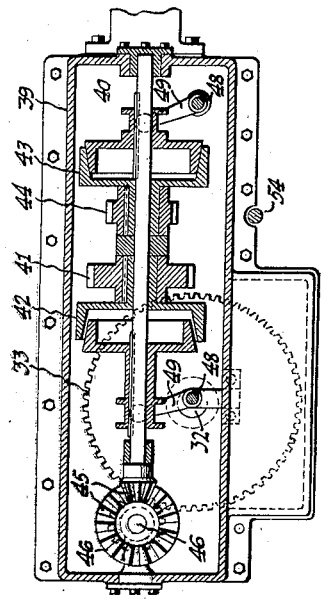
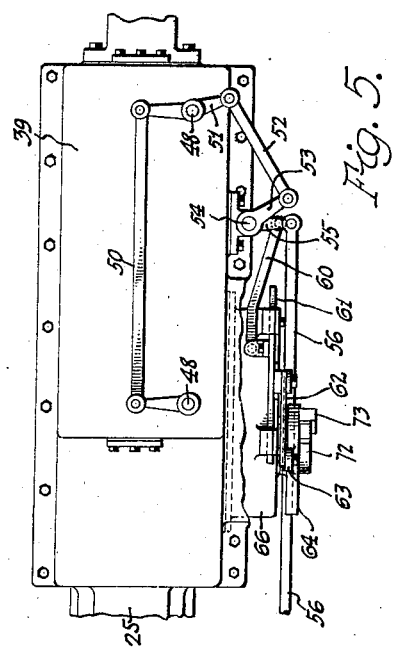
INVENTOR
Henry E. Morton,
BY
ATTORNEYS

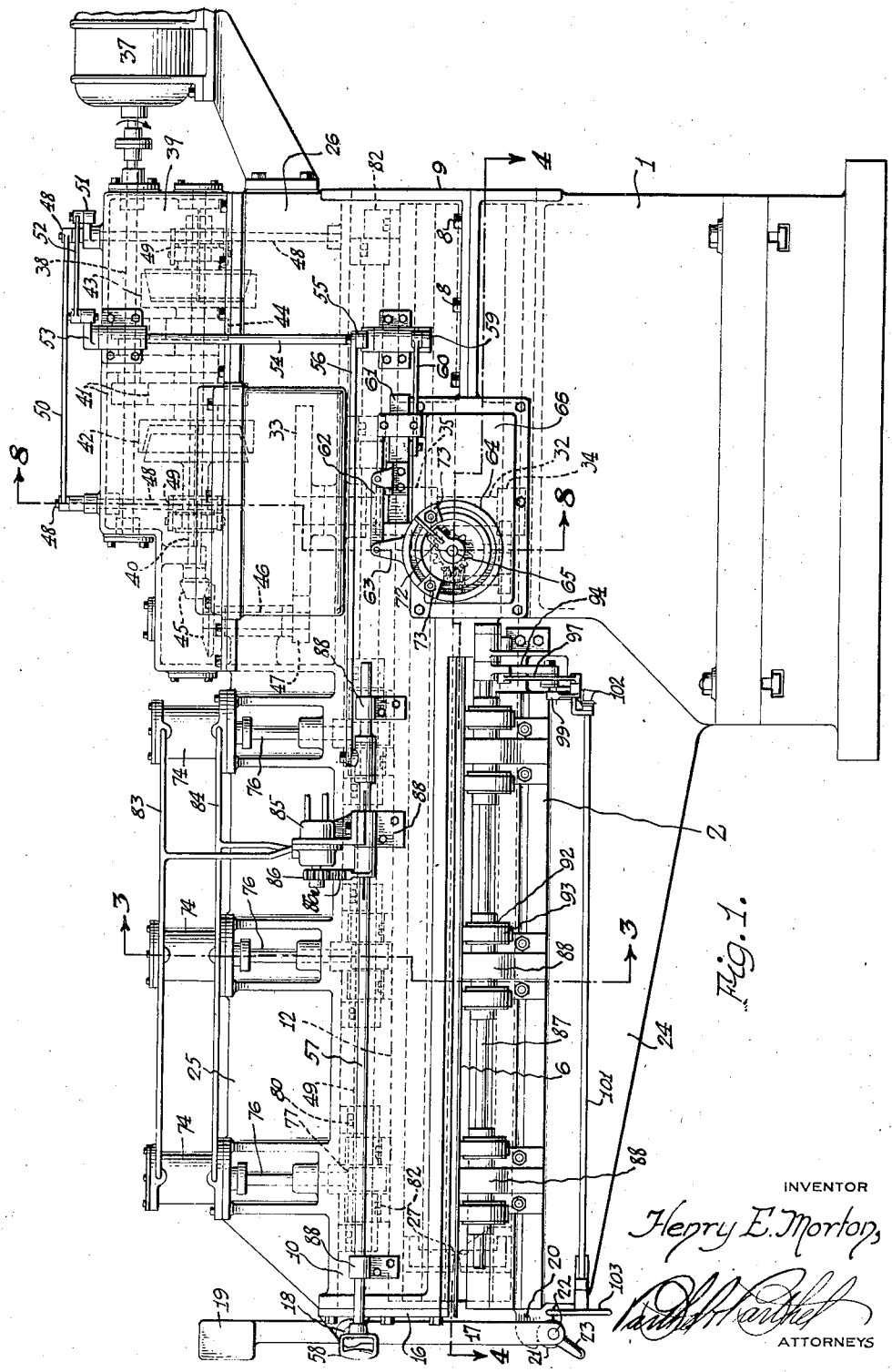

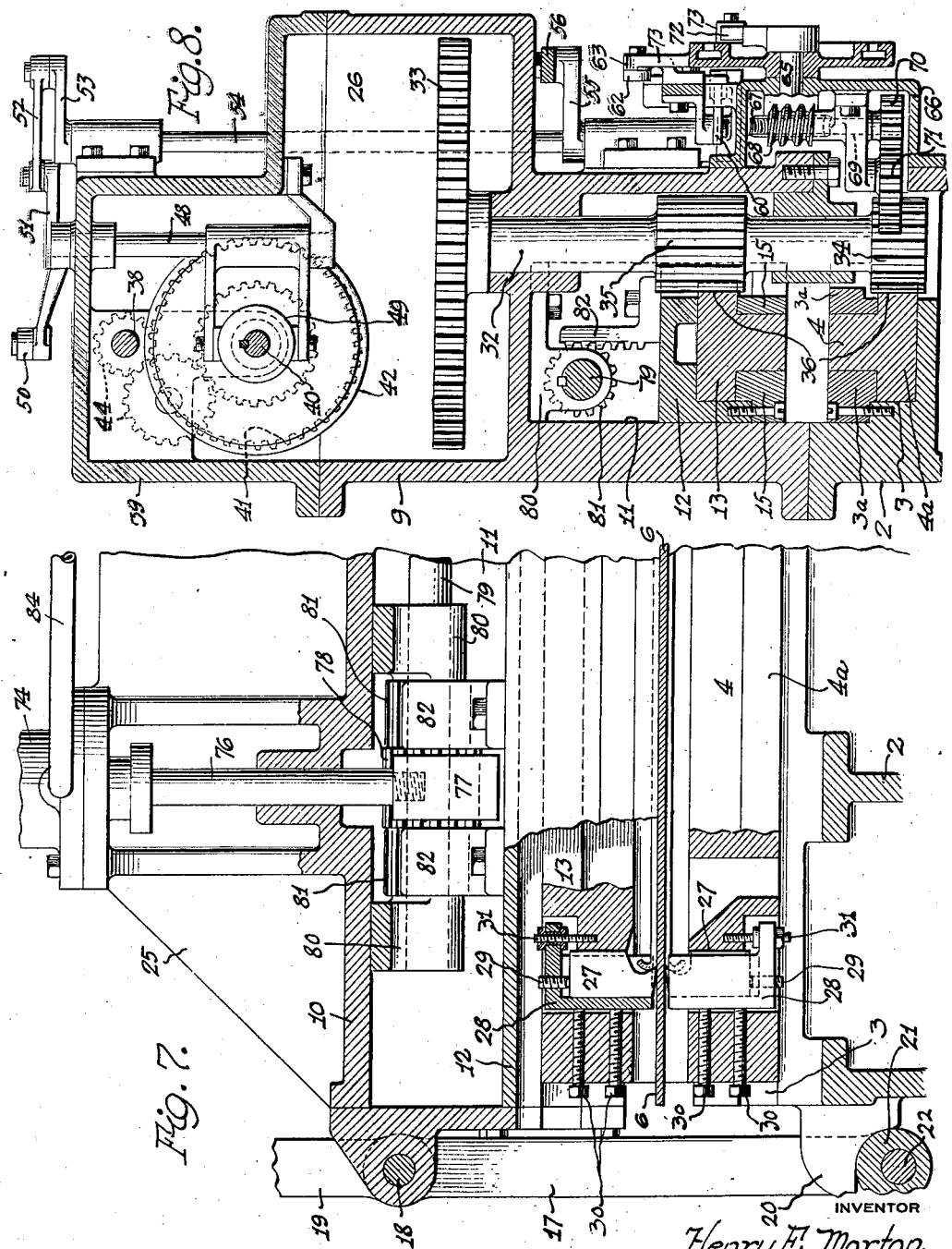

April 19, 1932.  H. E. MORTON  1,854,522
FLASH REMOVING MACHINE
Filed Jan. 19, 1931    5 Sheets-Sheet 5
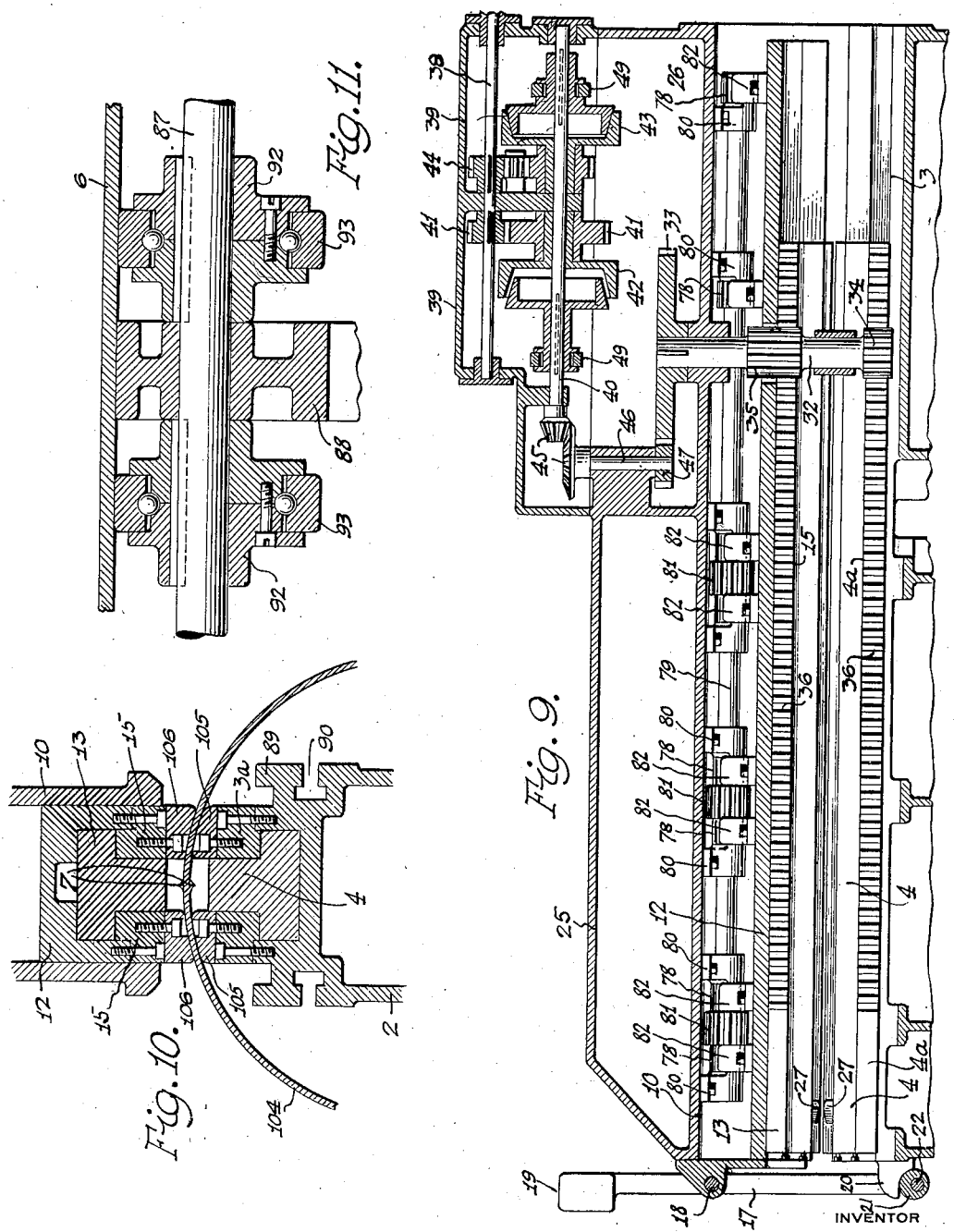
INVENTOR
Henry E. Morton,
BY
ATTORNEYS Patented Apr. 19, 1932

1,854,522

UNITED STATES PATENT OFFICE

HENRY E. MORTON, OF MUSKEGON HEIGHTS, MICHIGAN

FLASH REMOVING MACHINE

Application filed January 19, 1931. Serial No. 509,855.

This invention relates to a metal working machine of the type known as a draw-cut shaper, and more particularly to a machine of this class especially adapted for removing the flash from butt welded seams of sheet metal work, the present invention relating particularly to improvements in the machine shown and described in my co-pending application, Serial Number 475,965, filed August 18, 1930.

An object of the present invention is to provide for the automatic adjustment of the flash removing tools to the work according to the thickness of the sheet material, so that pieces of work of different thicknesses may be successively machined, and a further object is to rigidly clamp the work throughout its entire length to firmly hold it against deflection during the removal of the flash and to straighten the work so that there will be no variation in the adjustment of the tools due to such deflection or irregularities in the sheet material forming the work, and the flash will be removed even with the adjacent surfaces of the sheet material.

It is also an object of the present invention to move the work out of engagement with the clamping means and tools after the flash has been removed, and to so support the work that it may be freely removed from the machine without danger of scratching or otherwise injuring the surface of the work and other work may be as freely and expeditiously placed in operative position in the machine.

A further object is to provide a machine for the purpose which is sufficiently rigid to permit the complete removal of the flash at a single stroke of the ram and which machine embodies certain other new and useful features in the driving and control of operation of the same, all as hereinafter more fully set forth and particularly pointed out in the appended claims, reference being had to the accompanying drawings in which—

Figure 1 is a side elevation of a machine illustrative of an embodiment of the present invention;

Fig. 2 is an end elevation of the same drawn to a larger scale, with portions broken away to shorten the figure;

Fig. 3 is a transverse vertical section substantially upon the line 3—3 of Fig. 1;

Fig. 4 is a plan view of the lower part of the machine in the plane of the work bed, and showing the upper part of the machine removed and parts in section;

Fig. 5 is a plan view of an end portion of the machine showing clutch operating mechanism in plan view;

Fig. 6 is a horizontal section through the clutch casing shown in plan view in Fig. 5 and clutches therein, and parts adjacent thereto;

Fig. 7 is an enlarged sectional detail substantially upon the line 7—7 of Fig. 2, of an end portion of the supporting and ram guiding arms, showing tool carrying end portions of the ram therein and in section;

Fig. 8 is an enlarged cross section, substantially upon the line 8—8 of Fig. 1;

Fig. 9 is a longitudinal vertical section, substantially upon the line 7—7 of Fig. 2;

Fig. 10 is a sectional detail of a portion of the machine, said section corresponding to a portion of the section shown in Fig. 3 and illustrating a slightly modified construction; and Fig. 11 is a sectional detail showing work supporting rolls.

As shown in the drawings, 1 indicates a suitable standard or base having an arm or horn indicated as a whole by the numeral 2, formed integral with said standard and projecting laterally therefrom, said arm and standard being formed with a strong, rigid guideway 3 which, for convenience of assembly, may be formed in three parts, the upper parts 3a being bolted to the lower part at each side of the lower member 4 of a double tool carrying ram, said guideway extending completely across the upper end of said standard 1 and open at the rear end thereof so that said ram member may project at its rear end from said guideway in its reciprocation. This guideway also opens through the free end of said arm 2 and this ram member 4 is of inverted T-formation and the guideway therefor has laterally extending portions to receive the lateral ribs 4a on said ram member. The ram member is thus accurately guided throughout its length and firmly held in said way against deflection either upwardly or laterally.

Securely bolted or otherwise rigidly secured upon the upper side of said standard 1 and arm 2 at each side of said guideway therein and at each side of the upper side of said ram member 4, are longitudinal strips or bars 5 which together form a rigid work support or bed for the work, which work, as shown, comprises plates 6, the adjacent edges of which are electrically welded together, forming the flash indicated at 7 along the seam and which flash is to be removed even with the upper and lower surfaces of the plates. As these bars 5 are spaced apart far enough to permit the flash removing tools hereinafter referred to, to project therebetween into engagement with the work, and as these bars extend along the guideway for the full length of the work, they form a fixed rigid support for the work at its lower side parallel with and adjacent the entire length of the seam.

Rigidly secured in place upon the upper end of the standard 1 by means of bolts 8 or otherwise, is a casing 9, and this casing is formed with an integral forwardly extending rigid arm 10 of a length equal to that of the arm 2 on said standard, and spaced therefrom at its lower side to permit the work to be inserted between this upper arm 10 and the bars 5 on the lower arm 2, which bars form a rigid work supporting bed. This upper arm 10 and casing 9 are both formed with a guideway 11 extending throughout the length of said arm and casing and opening through the ends thereof, said guideway being of a size and shape to accurately guide a carrier block 12 forming a longitudinal guide for the upper member 13 of the double ram, to accurately guide said member in its longitudinal reciprocation in said block, said block being reciprocable vertically in said guideway 11 to move said ram member 13 vertically or reciprocate the same toward and from the lower member 4 of the ram and the block toward and from the work supporting bars 5 or fixed work bed.

Rigidly bolted or otherwise firmly secured to the lower end of the carrier block 12, at each side of the ram member 13, are bars 14 similar to the bars 5, these bars being also spaced apart the width of the lower face of the upper ram member to engage the work resting on the bed bars 5, at each side of and adjacent the seam thereof and extending the full length of the work and of a length equal to the length of the bed bars, so that when the carrier block is moved downwardly in its guide 11 these bars 14 will come into contact with the work 6 resting on the bars 5 or bed and firmly clamp the work throughout its length, at the same time straightening the work and limiting the approach of the cutting tool, hereinafter described as carried by the free end of the ram member 13, toward the work and toward a like tool carried by the free end of the lower ram member 4. Therefore the downward movement of the upper ram member carried by the block 12 brings the tool or tools carried thereby into proper relation to the work to remove the flash 7 even with the upper surface of the plates 6, and as the tool or tools carried by the lower ram member 4 are properly set relative to the upper surface of the bed bars 5, the flash at the lower side of the plates will be removed even with the lower surface of said plates. Further, as the downward movement of the carrier block is limited by coming into contact with the work, the thickness of the plates forming the work will regulate the approach of the cutting tools toward each other, and therefore variations in the thickness of plates will be provided for automatically.

The upper ram member 13 is preferably of T-form in cross section the same as the lower ram member, and to facilitate the placing of the member within its guide in the carrier block 12, separate members or strips 15 are bolted to the lower side of the block beneath the lateral ribs of the T-shaped ram member, these strips being similar to the members 3a of the fixed guideway 3. The end of the guideway 11 at the end of the arm 10, is closed by a plate 16 secured to the end of the arm and to prevent the spreading apart of the free ends of the arms 2 and 10 under the cutting strain of the tools carried by the ram members in removing the flash from the work, a yoke 17 is pivotally attached at 18 to said plate to be swung downward against the action of a counterbalance weight 19 with its lower end beneath lugs 20 projecting from the end of the lower arm 2 and firmly engaged with said lugs by means of eccentrics 21 pivotally attached at 22 to said yoke to be turned by means of a bail 23 into clamping engagement with said lugs. The free ends of said arms 2 and 10 are thus detachably tied together, and to further strengthen these arms against deflection, the lower arm 2 is formed with an integral hollow rib 24 tapered longitudinally to its juncture with the standard or base 1 and the upper arm 10 is formed with a hollow rib 25 extending throughout its upper side and integral at its rear end with a gear chamber 26 forming an enlargement of the rear end of the casing 9 above the guideway 11 therein.

Detachably and adjustably held within a suitable opening within the outer end of each ram member, is a cutting tool 27, these tools being substantially alike and positioned with their cutting ends in directly opposed relation, each tool being carried in a tool casing 28 in which the tool is adjusted toward the work by means of an adjusting screw 29 and the tool casing being adjustably held in the opening in the end of the ram by screws 30 passing through the end of the ram and an adjusting screw 31. The cutting tool carried by the lower ram member 4 may, therefore, be adjusted accurately, relative to the surface of the fixed work bed formed by the bars upon which the plates 6 are supported and therefore relative to the lower surface of these plates so that said tool will remove the flash even with their lower surface, and the tool carried by the upper ram member 13 may be accurately adjusted relative to the lower surface of the bars 14 so that when the plates are clamped between the bars 5 and 14, the said tool will be in a position to remove the flash from the upper sides of the plates even therewith. If found desirable, a series of these tools may be positioned along the ram members and properly adjusted to operate successively on the work, each pair of tools operating to remove a portion only of the flash during a single stroke of the ram.

To reciprocate the two members of the double ram simultaneously in a longitudinal direction, a vertical drive shaft 32 is mounted in bearings in the casing 9 with its upper end extending into the gear chamber 26 and provided with a large gear wheel 33, and on this shaft are also formed small gears or pinions 34 and 35 to engage rack teeth indicated at 36 in Figs. 4 and 9, formed on the side edge of one of the lateral flanges of each ram member throughout a greater portion of its length, the gear 34 engaging the lower ram member 4 and the gear 35 engaging the upper ram member 13. The gear 35 is of considerably greater length than the width of the rack on the ram with which it engages so that said ram member may be moved upward in the guideway 11 by its carrier block 12 without disengaging its rack teeth 36 from the gear 35.

The power for reciprocating the double ram longitudinally is, as shown, furnished by an electric motor 37 (Fig. 1) mounted upon a bracket on the rear end of the casing 9, but it will be understood that any suitable source of power may be employed. The armature shaft of this motor is directly connected to one end of a counter shaft 38 mounted in bearings in the upper part of a supplemental casing 39 mounted upon the top of casing 9 over the chamber 26 and extending parallel with a clutch shaft 40 in this casing.

Motion is transmitted from the counter-shaft 38 to a clutch 42 on the clutch shaft through a train of gears 41 shown in Fig. 9 and to the clutch 43 through a similar gear train 44. The shaft 40 will therefore be driven in one direction or the other depending upon which clutch is thrown in. From the forward end of shaft 40, motion is transmitted through bevel gears 45 to a vertical shaft 46 mounted in bearings in the casing and extending downward in the chambers 26 to adjacent the periphery of the large gear 33 where it is provided on its lower end with a gear 47 to mesh with this large gear and impart rotation thereto to turn the gears 34 and 35 and move simultaneously, the two members of the ram in a direction longitudinally, depending upon which of the two clutches 42 or 43 is thrown into engagement.

For the purpose of simultaneously moving the clutches 42 and 43, a vertical rod 48 is mounted in bearings adjacent each clutch and these rods extend through the top of the casing 39. On each of these rods is a fork 49 each arranged to engage a groove in the hub of one of said clutches, so that when said rods are turned, the cone members of these clutches will be moved longitudinally of the shaft 40, the one into engagement with its cup member and the other out of engagement with its cup. The direction of rotation of the large gear 33 may therefore, be reversed at will, the upper ends of said rods 48 being provided with cranks connected by a connecting rod 50 for simultaneous rotation of said rods in the same direction, one of said rods being provided with a crank 51 on its outer end connected by a link 52 to a similar crank arm 53 on the upper end of a vertical shaft 54 outside the casing and extending downward where it is mounted at its lower end in a bearing secured to the outside of the casing 9. This shaft is in turn provided with an arm 55 near its lower end to which a connecting rod 56 is attached at one end, its opposite end being connected to a push and pull rod 57 mounted in suitable bearings on the side of the arm 10 of the casing and extending to the forward end of said arm where it is formed with a handle 58 by means of which said rod may be moved longitudinally by the operator to rotate the shaft 54 and shift the clutches at will to stop or start the machine or to reverse the direction of drive of the double ram.

To effect an automatic shifting of the said clutches and thus automatically reverse the travel of the double ram at each end of the cutting stroke thereof, an arm 59 is secured to the extreme lower end of the shaft 54, and to this arm is connected one end of a link 60, the opposite end of said link being connected to a slide bar 61 which, in turn is connected by a link 62 to the end of a rigid arm 63 on the periphery of a rotatable stop member 64 mounted for free turning movement upon the end of a horizontal shaft 65 extending into a worm casing 66 secured to the side of the casing 9. On the inner end of this shaft 65 (see Fig. 8) is a worm wheel 67 in mesh with a worm 68 on a vertical shaft 69, to the lower end of which a gear 70 is secured in mesh with an idle gear 71, which idler is in mesh with the gear 34 which drives the lower ram member 4. The shaft 65 is thus turned in one direction or the other according to the direction of movement of the ram member and because of the gear and worm reduction, said shaft will be rotated through only a part of a single turn to swing an arm 72 secured upon its outer end, over a portion of the face of the stop member or wheel 64 into engagement with adjustable stops 73 on said wheel, and which stops may be adjusted upon said wheel so that said arm 72 will contact therewith at each end of the desired stroke of the ram and by so doing, rotate said wheel 64 and through its connection with the shaft 54, turn said shaft sufficiently to effect a shifting of the clutches 42 and 43, thus automatically reversing the direction of reciprocation of the ram.

To effect the bodily raising or lowering of the upper ram member 13 and its carrier or guide block 12 in the guide way 11, a series of air cylinders 74 is mounted upon the arm 10 of the casing 9, each cylinder having a piston 75 therein provided with a piston rod 76, which rods extend vertically downward through suitable bearings, into the upper part of the guide way 11, and on the lower end of each rod within said guideway is a rack 77, which racks are in mesh with sectors 78 secured upon a shaft 79 extending longitudinally of said guide way and mounted in bearings 80 depending from the upper wall of said way. On the shaft 79 at each side of the sector 78 thereon, is a gear 81 and these gears are in mesh with racks 82 secured upon the upper end or side of the carrier block 12. Air or other fluid under pressure, admitted to all of the cylinders simultaneously, will move the pistons therein and through the rack and sector connection of each piston rod, turn the shaft 79 and through rack and pinion connection of each shaft with the carrier or guide block 12, raise or lower said block and ram member mounted therein, within the guideway 11, toward or from the work supporting bed members 5 on the lower arm 2.

To control the admission of fluid under pressure to these several cylinders 74, pipe lines 83 and 84 extend adjacent one side of the several cylinders, the line 83 having branches opening into the upper ends of said cylinders, and the line 84 having branches opening into the lower ends of the several cylinders. The two pipe lines are extended downward and connected into a valve casing 85 having therein a suitable rotary valve (not shown) for controlling the flow of fluid to these lines, the stem of said valve being provided outside the casing, with a gear 86 in mesh with a sector 86a on the push-pull rod 57 and splined thereon to turn with said rod but permitting free endwise movement of said rod through said sector.

As previously described, the rod 57 provides a hand control for shifting the clutches 42 and 43 by an endwise movement of said rod, thus controlling manually the reciprocation of the double ram in its cutting and idle strokes, and by turning said control rod, and valve controlling the flow of fluid to the several cylinders, is regulated to control vertical bodily movement of the upper ram member and its carrier or guide block, toward and from the lower ram member.

As pointed out, the upper ram member 13 and its carrier block 12 are moved bodily upward to provide a space between the bars 14 on the block and the bars 5 forming the fixed work bed, so as to facilitate the insertion of the work into the machine upon said bed and its removal therefrom. When the work consists of wide flat plates 6 as shown in Figs. 2 and 3, its removal may be difficult due to the liability of scratching or otherwise marring the surface of the work in removing it from the machine, and to aid in such insertion and removal, and also to support the plates laterally of the machine during the machining operation, a shaft 87 is supported parallel with each side of the lower arm 2 and extending substantially the full lengths of said arm, each shaft being supported by a series of brackets 88 adjustably secured to said arm by providing an upstanding rib 89 on the arm over which rib a downwardly extending rib on each bracket engages, and providing a longitudinal T-slot 90 in each side of the arm adjacent the lower ends of the brackets to receive the heads of bolts 91 on the brackets. The brackets may therefore be moved to any desired position along the supporting arm by simply loosening the bolts 91 and sliding the brackets along the supporting ribs 89.

As shown in Fig. 11, each bracket 88 provides a bearing for shafts 87 and secured to said shafts to turn therewith at each side of each bracket, is an eccentric 92 carrying a ring 93 free to turn thereon, said rings thus forming freely rotatable rollers to engage the under side of the work 6 to support the same laterally of the arm 2 in the plane of the upper side of the bars 5 forming the fixed work supporting bed, when said work is clamped in place on said bed. To raise the work clear of said bed when it is desired to remove it from the machine, the shafts 87 may be rotated simultaneously, thus rotating the eccentrics 92 to bring their high sides uppermost and thus raise all of the supporting rollers simultaneously, and lifting the work so that it is free of the bed and may be rolled laterally of the bed on said rollers in removing it from the machine. Danger of scratching or other injury to the surface of the finished work is thus obviated and its removal from the machine greatly facilitated. The insertion of the work into the machine is also facilitated as it may be rolled into place upon these rollers.

To simultaneously turn the shafts 87 and thus raise all of the rollers 93 at the same time, each shaft is provided adjacent its rear end with an arm 94 and these arms are connected by a connecting bar 95, and one of said shafts has an arm 96 to which a link 97 is attached at one end, the opposite end of said link being pivotally connected to an arm 98 on a gear sector 99 which is in mesh with a worm 100 fixedly mounted at one side of the supporting arm 2 of the machine and rotated by means of an operating shaft or rod 101 connected to said worm to turn the same by means of bevel gears 102, said rod extending to the forward end of the arm 2 where it is provided with a hand wheel 103 for manually turning said rod and simultaneously rotating the eccentrics 92 to raise the supporting rollers 93 and lift the work.

As shown in Fig. 10, the construction may be slightly modified to adapt the machine for operating upon curved or tubular work as indicated at 104, and comprising a sheet of metal rolled into tubular form with its longitudinal edges welded together, leaving the flash 7 at the inner and outer sides of the tube to be removed. When operating upon such tubular work, the brackets 88 and their work supporting rollers are removed to permit the tubular work to be sleeved endwise over the supporting arm 2 between the upper and lower ram members, and to conform to the curvature of the work adjacent its seam, the bars 5 forming the work supporting bed, are removed and other similar bars 105 substituted therefor having their upper surface properly curved to conform to the curve of the inner surface of the work, and the bars 14 on the carrier block 12 are also removed, and other similar bars 106 substituted therefor having lower transversely curved faces to conform to the curvature of the outer surface of the tube. The machine may, therefore, be quickly changed to operate upon transversely curved or tubular work, and will operate to remove the flash therefrom, just as efficiently as from sheet metal plates.

This machine, because of the construction and arrangement of its elements and the manner in which they co-operate, is very efficient in operation and the insertion and removal of the work therefrom is facilitated and danger of injury to the finished work obviated. Further, the work is rigidly held during the machining operation and the manner in which it is held effects a straightening of the work so that when the work is clamped, this bringing of the carrier block into clamping engagement with the work, will accurately position the cutting tools relative to the surfaces of the work. Further, the manner in which power is applied to drive the ram members makes for efficient and automatic operation, as well as the application of power to raise the carrier block and its ram to release the work. Obviously changes may be made in the particular means for reversing the direction of movement of the ram members and in the means for applying power, as well as in other specific parts of the machine, without departing from the spirit of the invention, and I do not, therefore, limit myself to the particular construction shown and described.

Having thus fully described my invention, what I claim is:

1. In a machine of the character described, the combination of two separate longitudinally reciprocable ram members spaced apart at their adjacent sides, means provided with guide ways for said ram members including a movable block formed with a guideway for one of said ram members, means for simultaneously reciprocating said ram members, cutting tools carried by said ram members to engage opposite sides of work interposed between said ram members, a fixed work supporting bed opposed to said block, and geared power means for moving said block toward said bed to engage work on said bed and straighten the same.

2. In a machine of the character described, the combination of means forming a work supporting bed and provided with a longitudinal guide way, a ram member reciprocable in said guide way, a carrier member formed with a longitudinal guide way, a second ram member reciprocable in said guide way of said carrier member, means for simultaneously reciprocating said ram members in their guide ways, and geared power means for moving said carrier member toward said work supporting bed to clamp work therebetween and straighten the work.

3. In a machine of the character described, the combination of means forming a work supporting bed, a ram member longitudinally reciprocable below said bed, a ram member longitudinally reciprocable above said bed and spaced from said ram member below said bed to receive work between said ram members, cutting tools carried by said ram members to engage opposite sides of work on said bed, means for reciprocating said ram members, clamping means above said bed of a length equal to said bed for clamping work throughout the length of the work in place upon said bed and effecting a straightening of the work, said ram member above said bed being carried by and movable with said clamping means toward and from the work, and means for moving said clamping means toward and from said bed.

4. In a machine of the character described, the combination of means forming a work supporting bed, a ram member reciprocable longitudinally relative to said bed, a cutting tool carried by said ram member adjacent one end thereof to remove metal from one side of said work supported by said bed, a carrier member movable toward said bed to clamp and straighten the work upon said bed and limit the movement of said member toward said bed, a longitudinally reciprocable ram member carried by said carrier and movable therewith toward said bed, a cutting tool carried by said last named ram member in opposed relation to said tool on the other ram member to remove metal from the opposite side of said work supported by said bed, means for reciprocating said ram members, and means for moving said carrier member into work clamping and straightening position and said ram member carried thereby, toward the work.

5. In a machine of the character described, the combination of a base having a laterally extending arm formed with a longitudinal guide way and providing a work supporting bed, a second arm spaced from said first arm above said bed and formed with a vertical guide way, a carrier member movable in said vertical guide way and formed with a longitudinal guide way, ram members in said longitudinal guide ways, cutting tools carried by said ram members to remove metal from opposite sides of work on said bed, means for moving said carrier member toward said bed to clamp and straighten work between it and said bed and to move said ram member carried thereby toward the work, the movement toward the work of said carrier member and ram carried thereby being limited by said carrier member coming into clamping engagement with the work to put a heavy pressure thereon, and means for reciprocating said ram members simultaneously.

6. In a machine of the character described, the combination of supporting means comprising members spaced apart at their adjacent sides with guide ways formed therein, opening through said sides, tool carrying ram members reciprocable longitudinally of said guide ways to remove metal from opposite sides of work supported in said space between said supporting members, means for reciprocating said ram members, work supporting members arranged laterally of said supporting members, and means including eccentrics for adjusting said work supporting members to raise the work in removing the same from between said work supporting members transversely thereof.

7. In a machine of the character described, the combination of a standard, a rigid supporting arm projecting laterally from said standard, a casing secured upon said standard and formed with a laterally extending arm having a side parallel with and spaced from said supporting arm to provide a work receiving slot between said arms, means on said supporting arm forming a work supporting bed throughout the length of said slot, ram members reciprocable longitudinally of said arms at opposite sides of said slot and carrying cutting tools to remove metal from opposite sides of the work held in said slot, a plurality of work supporting rollers at opposite sides of said rigid supporting arm to support work laterally of said arm in the plane of said bed, and means including eccentrics for simultaneously moving said rolls upwardly to lift the work from said bed.

8. In a machine of the character described, the combination of a standard, a rigid supporting arm projecting laterally from said standard, a casing secured upon said standard and provided with a laterally extending arm having a side parallel with and spaced from said supporting arm to provide a work receiving slot between said arms, members on said supporting arm extending substantially throughout the length of said slot and forming a work supporting bed at each side of a seam in the work, a carrier member movable vertically within said arm of said casing to engage the work on said bed and clamp and straighten the same in place thereon, said carrier member being formed with a longitudinal guideway, geared power means for moving said carrier member, ram members reciprocable longitudinally of said arms with one of said ram members mounted in said guideway in said carrier member and movable therewith toward and from said bed, and a cutting tool upon the free end of each ram member to remove metal from opposite sides of the work held in said slot and along said seam therein, and means for reciprocating said ram members.

9. In a machine of the character described, the combination of supporting means having a longitudinally extending transverse work receiving slot and a guide way below said slot extending longitudinally thereof and open into the lower side of said slot, a ram member reciprocable in said guide way, a vertically movable block guided in said supporting means above said slot and formed with a guide way open into the upper side of said slot, a ram member reciprocable in said guide way in said block and movable vertically with said block, cutting tools carried by said ram members to engage the opposite sides of work supported in said slot, means for reciprocating said ram members, bars detachably secured to said supporting means along the lower side of said slot throughout the length thereof at each side of said guide way at said lower side of said slot and together forming a rigid work supporting bed to engage work along opposite sides of a welded seam of the work, and geared power means for moving said block toward said bed to clamp and straighten work throughout the length of said slot, in place upon said bed.

10. In a machine of the character described, the combination of supporting means having a longitudinally extending transverse work receiving slot and formed with a horizontal guide way at the lower side of said slot and a vertical guide way at the upper side of said slot, a ram member reciprocable in said guide way at the lower side of said slot, a carrier block in said vertical guide way at the upper side of said slot and formed with a longitudinal guide way, a ram member reciprocable in said guide way in said block, means for reciprocating said ram members in said guide ways, and means including a plurality of cylinders having pistons therein operatively connected to said block for moving said block in said vertical guide way to engage, straighten, and clamp work positioned in said slot.

11. In a machine of the character described, the combination of supporting means having a longitudinally extending transverse work receiving slot and formed with a horizontal guide way at the lower side of said slot and a vertical guide way at the upper side of said slot, a ram member reciprocable in said guide way at the lower side of said slot, formed bars at opposite sides of said guideway and ram member extending along the lower side of said slot and throughout the length thereof and forming a work supporting bed for work positioned in said slot, a carrier block of a length substantially equal to the length of said bars in said vertical guide way at the upper side of said slot and formed with a longitudinal guide way, a ram member reciprocable in said guide way in said block and movable with said block toward and from said other ram member, bars on said block at opposite sides of said guide way and ram member to oppose said bars forming said bed and clamp work therebetween throughout its length to straighten the work when said block is moved downward in its vertical guide way, means for reciprocating said ram members, means for moving said block toward said bed to clamp and straighten the work, work supporting means extending laterally from each side of said bed in the horizontal plane thereof, and means for raising said work supporting means to raise the work upon release thereof by the raising of said block.

12. In a machine of the character described, the combination of a standard having a rigid laterally extending supporting arm, a casing on said standard having a laterally extending arm spaced along its lower side from said supporting arm to provide a work receiving slot, ram members reciprocable in said arms above and below said slot, said upper arm having a vertical guide way, a carrier block in said guide way and formed with a longitudinal guide way for one of said ram members, means for simultaneously reciprocating said ram members, and means for moving vertically said carrier block and ram member carried thereby, said means including a plurality of cylinders on said upper arm having pistons therein operatively connected to said carrier block, and a valve for controlling the flow of fluid under pressure to all of said cylinders to operate said pistons therein and raise or lower said carrier block.

13. In a machine of the character described, the combination of supporting means including a fixed bed extending throughout the length of work supported thereon and formed with a guide way throughout its length, a ram member reciprocable in said way, a carrier member movable toward and from said bed and of a length equal to the length of said bed and formed with a longitudinal guideway, a ram member reciprocable in said guideway of said member, cutting tools carried by said ram members adjacent the free ends thereof to engage opposite sides of work interposed between said ram members and resting upon said bed, means for reciprocating said ram members in their guide ways, and power means for moving said carrier member and ram member carried thereby, toward said bed.

In testimony whereof I affix my signature.

HENRY E. MORTON.